July 15, 1952
C. J. MALHIOT
2,603,339
ARTICLE CONVEYING AND TRANSFERRING MECHANISM
Filed May 7, 1948
6 Sheets-Sheet 1
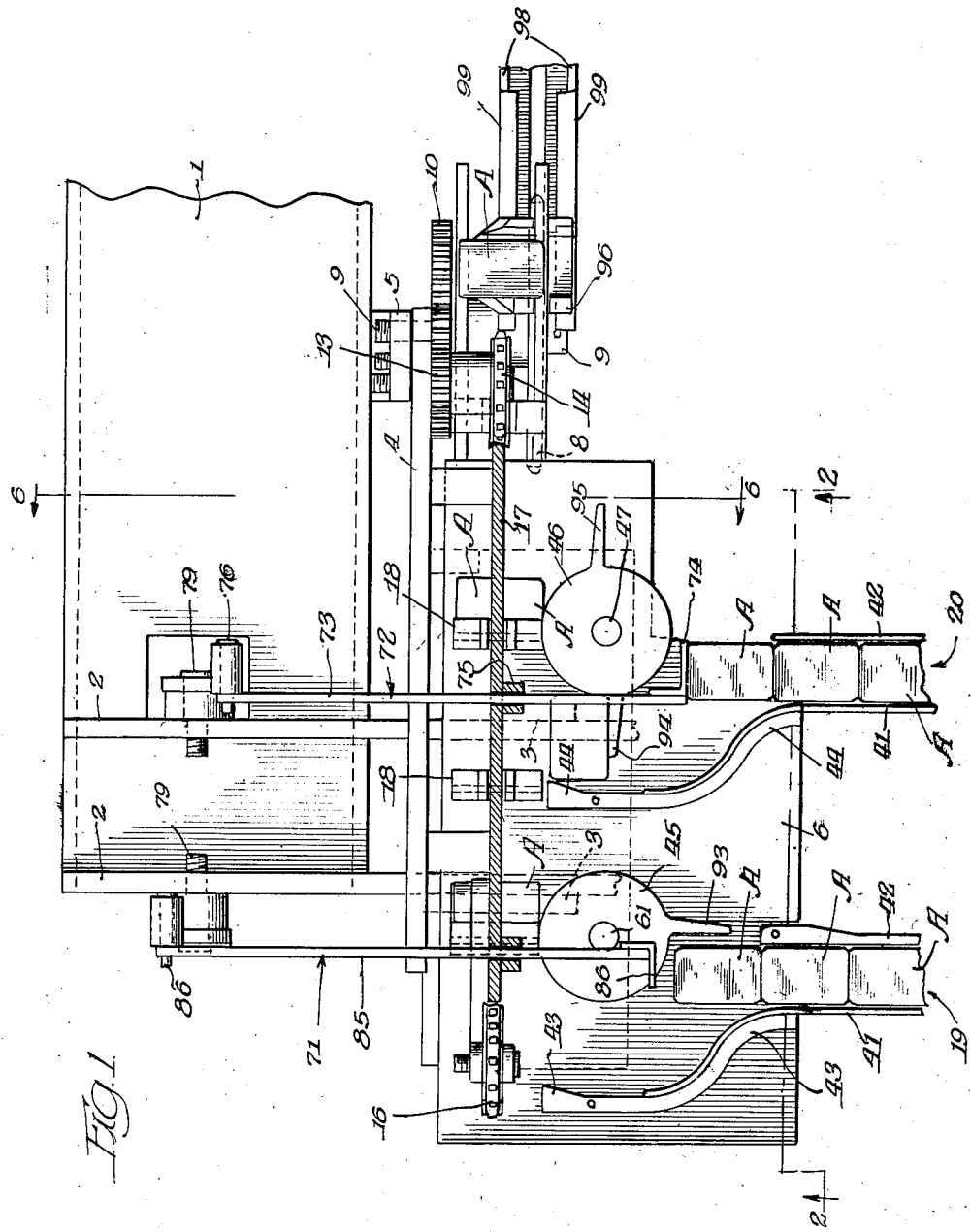
Inventor
Clarence J. Malhiot
By: Spencer, Marzall, Johnston & Cook,
Attys.

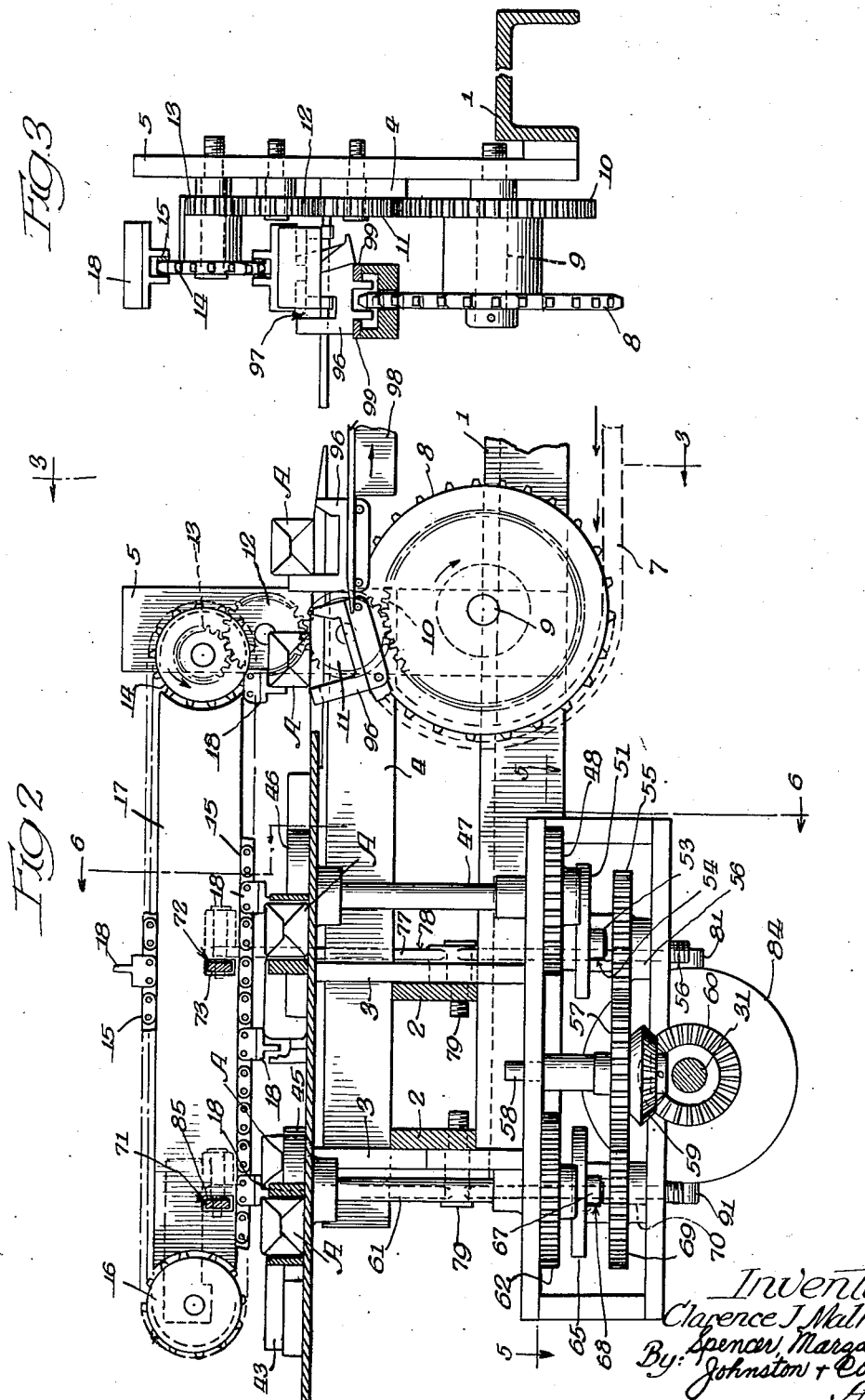
July 15, 1952   C. J. MALHIOT   2,603,339
ARTICLE CONVEYING AND TRANSFERRING MECHANISM
Filed May 7, 1948   6 Sheets-Sheet 2

July 15, 1952 C. J. MALHIOT 2,603,339
ARTICLE CONVEYING AND TRANSFERRING MECHANISM
Filed May 7, 1948 6 Sheets-Sheet 3
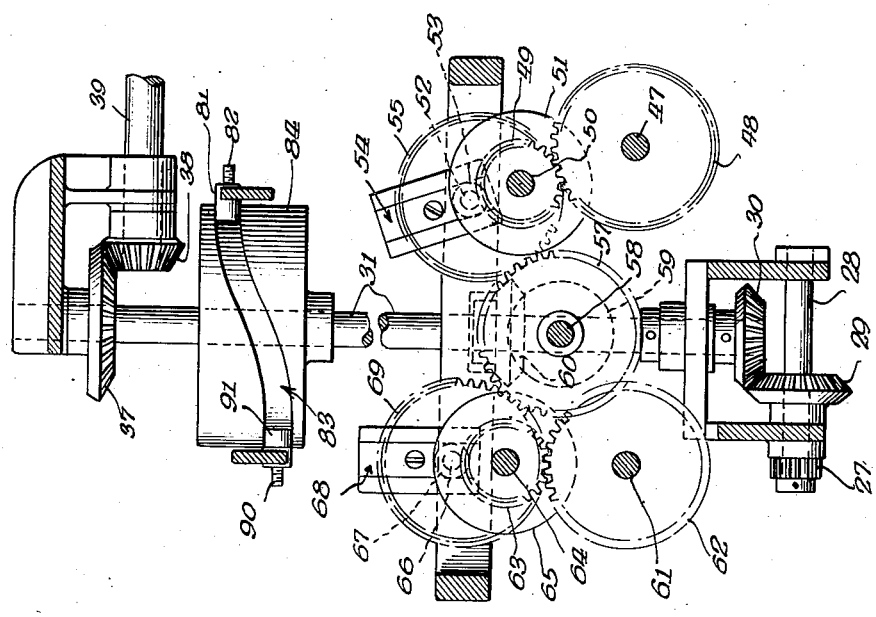
Inventor
Clarence J. Malhiot
By: Spencer, Marzall, Johnston & Cook
Attys

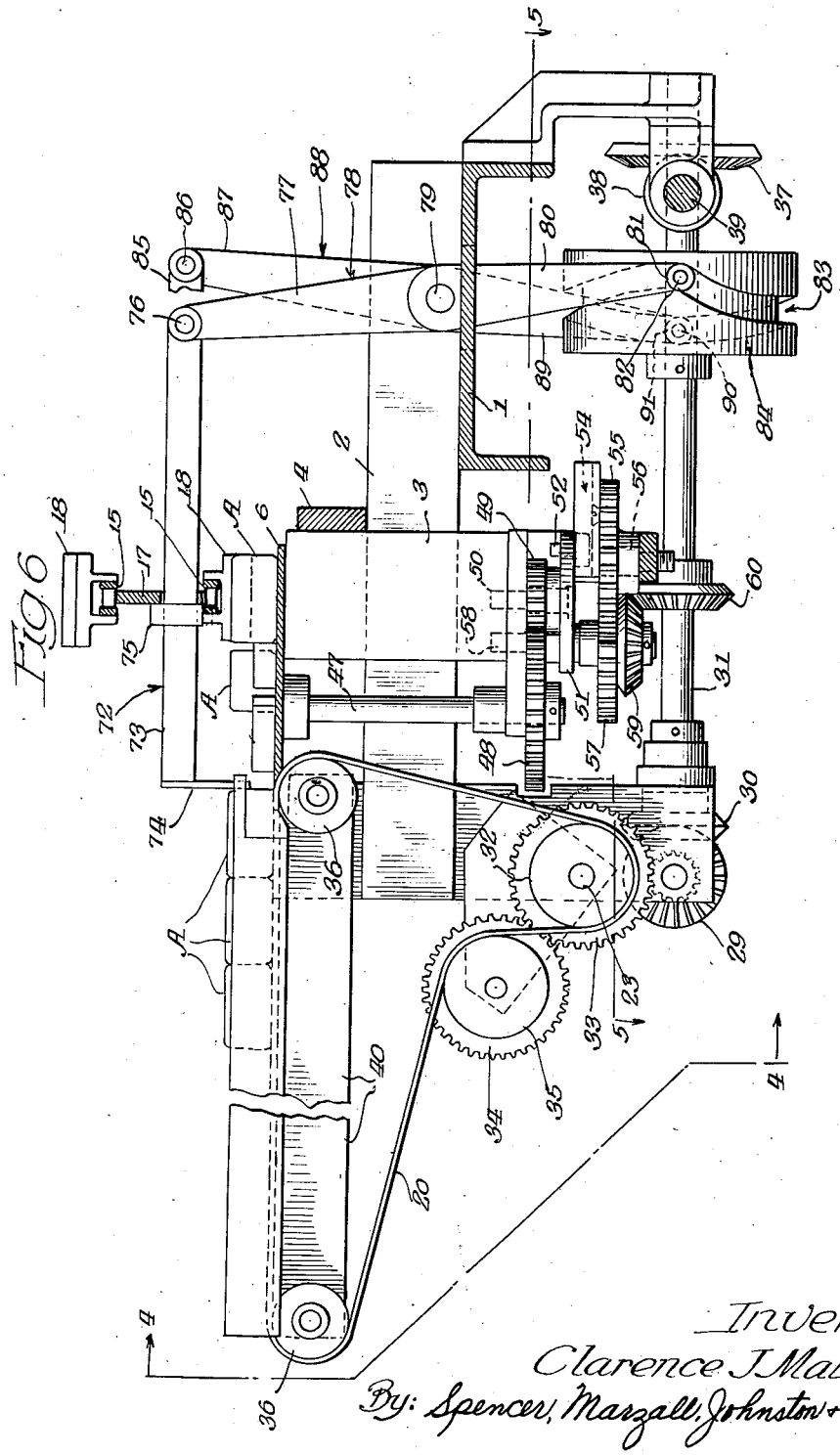

July 15, 1952 C. J. MALHIOT 2,603,339
ARTICLE CONVEYING AND TRANSFERRING MECHANISM
Filed May 7, 1948 6 Sheets-Sheet 5
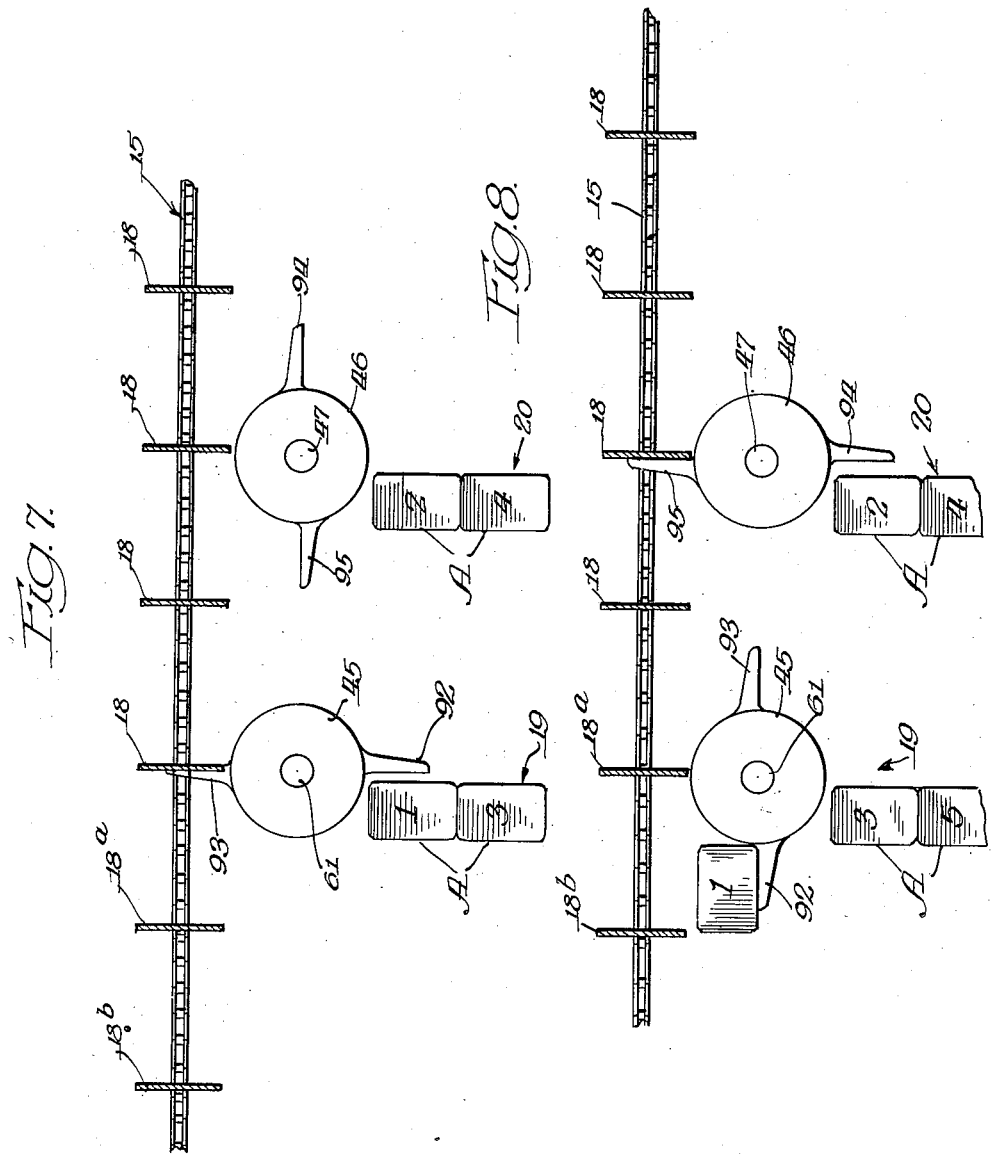
Inventor
Clarence J. Malhiot
By: Spencer, Marzall, Johnston & Cook
Attys

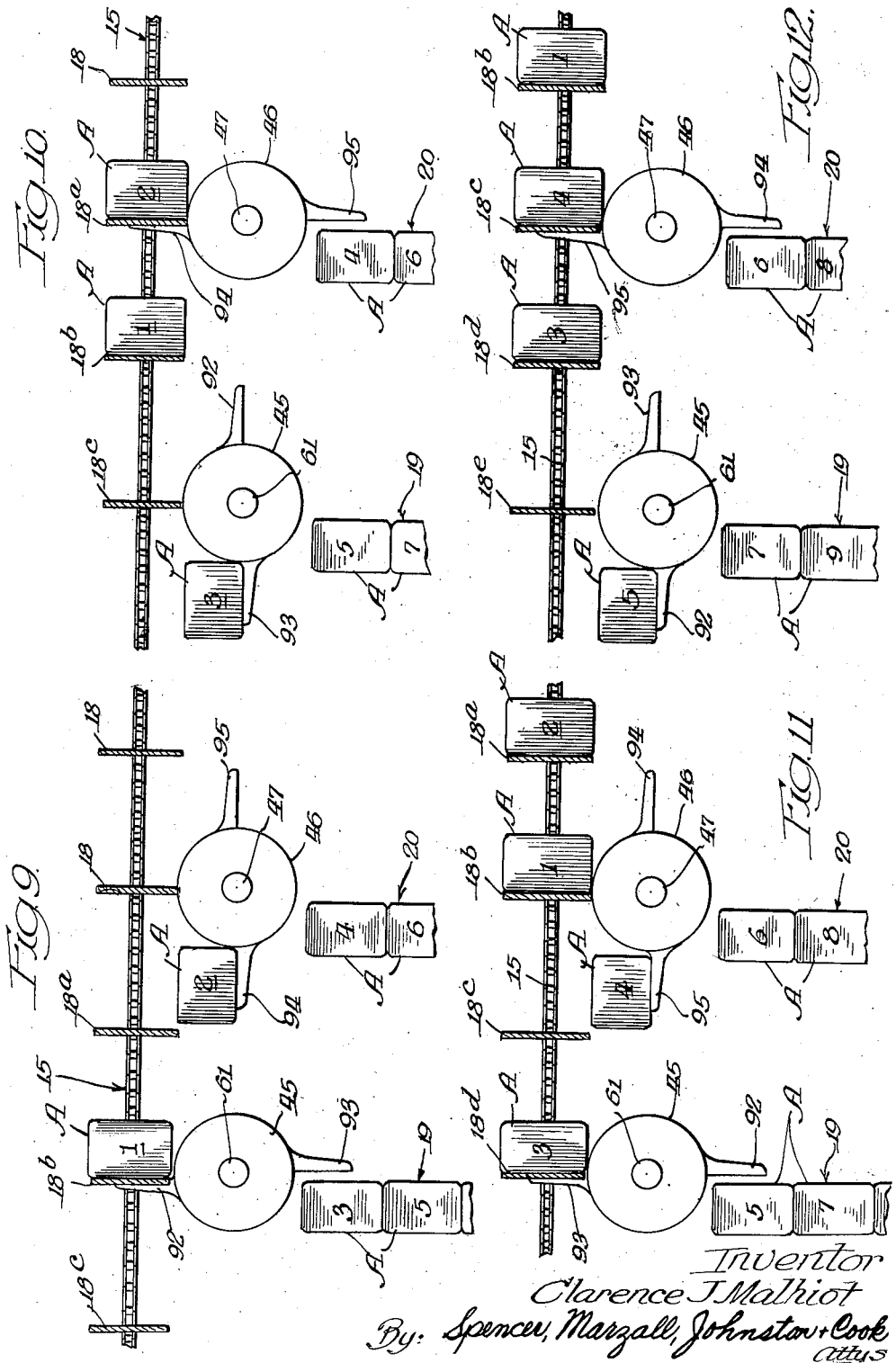

Patented July 15, 1952

2,603,339

UNITED STATES PATENT OFFICE 2,603,339

ARTICLE CONVEYING AND TRANSFERRING MECHANISM

Clarence J. Malhiot, Oak Park, Ill., assignor to F. B. Redington Co., Chicago, Ill., a corporation of Delaware Application May 7, 1948, Serial No. 25,575

3 Claims. (Cl. 198—23)

This invention relates to package conveying mechanism and to the method of conveying packages.

An important object of the present invention resides in the provision of new and improved means for feeding articles in a novel manner from a plurality of separate conveyors and depositing the articles on another single conveyor.

Another object of the invention is the provision of conveying mechanism for feeding articles from a plurality of conveyors alternately to a separate conveyor which is angularly positioned with respect to the other conveyors.

Another object is the provision of conveying mechanism for feeding articles successively to a rapidly moving conveyor from a plurality of slower moving conveyors which are angularly disposed with respect to the rapidly moving conveyor, the articles from the slower conveyors being fed alternately to the rapidly moving conveyor.

A further object of the invention consists in the provision of new and novel mechanism for shifting or feeding articles alternately from slow conveyors to a fast conveyor which is angularly positioned with respect to the slower conveyors, the articles being spaced an appreciable distance apart on the fast conveyor and then arranged in close proximity on a receiving conveyor to be cartoned or otherwise packaged.

A still further object of the invention is the provision of improved means, properly correlated and synchronized with respect to certain operable mechanism, for assuring articles fed by slow moving conveyors to be shifted at the proper time from a predetermined position on the slow conveyors to a predetermined position on a fast moving conveyor.

Another object is to provide article feeding and conveying mechanism with novel operating mechanism which is correlated and synchronized properly to provide proper timing of the various parts and to insure proper speeds of the conveying parts to permit continuous operation.

Still another object resides in providing new transferring devices with variable speeds so that articles from slow moving feed conveyors will be moved first slowly from the feed conveyors and then speeded during a portion of transfer travel until the articles are in juxtaposition with respect to a faster moving angularly disposed conveyor when the speed is again reduced to insure the articles being positioned properly on the faster conveyor.

Still another object is an improved method of removing articles from a plurality of conveyors and then feeding the articles in a new and novel manner to a faster moving conveyor and in a proper sequence.

Numerous other objects and advantages will be apparent throughout the progress of the specification which follows.

The accompanying drawings illustrate a selected embodiment of the invention and the views therein are as follows:

Fig. 1 is a detail plan view of an apparatus embodying the invention.

Fig. 2 is a detail elevational view looking in the direction of the arrows 2—2 of Fig. 1.

Fig. 3 is a detail transverse sectional view on the line 3—3 of Fig. 2.

Fig. 4 is a detail elevational view looking in the direction of the arrows 4—4 of Fig. 6.

Fig. 5 is a detail plan section on the lines 5—5 of Figs. 2 and 6.

Fig. 6 is a detail vertical sectional view on the line 6—6 of Fig. 1, and

Figs. 7 to 12 are diagrammatic views showing the manner in which articles are deposited alternately and successively on the main conveyor from a plurality of feed conveyors.

The particular construction herein shown for the purpose of illustrating the invention comprises a main frame or supporting structure 1 which includes spaced transverse bars 2 connected to upright members or uprights 3, Figs. 1 and 2. Longitudinal plate supporting members 4 are carried by the upright members 3, and assists in supporting a vertically disposed plate or other structural member 5, Figs. 2 and 3. A flat horizontal platform in the form of a top plate or table 6, is supported suitably and properly on the supporting structure 1, preferably by being supported principally by the uprights 3, Figs. 1, 4, and 6.

Article conveyor

A conveyor drive chain 7, Fig. 2, is driven by a drive sprocket (not shown) and drives a sprocket 8 on a drive shaft 9, which is suitably mounted in proper bearings carried by the main frame 1. A gear 10, Figs. 2 and 3, fixed rigidly to the sprocket 8, has meshing engagement with an idler gear 11 which meshes with and drives another idler gear 12. The idler gear 12 drives a driver gear 13 to which a driving sprocket 14 is attached rigidly. A conveyor chain 15, which is trained over the sprocket 14, and over an idle sprocket 16, Fig. 2, is driven by the drive sprocket 14. A conveyor support 17 is arranged between the upper and lower reaches of the conveyor chain 15 and supports the chain intermediate the sprockets 14 and 16 as shown clearly in Fig. 2. The sprocket chain 15 carries a plurality of equally spaced lugs 18 which extend downwardly from the lower reach of the chain and engage successive articles to be conveyed along a given path to discharge position, Figs. 1 and 2, the articles being conveyed to the machine by a plurality of angularly spaced feed conveyors 19 and 20, Figs. 1 and 6.

Feed conveyors 19 and 20

The conveyors 19 and 20, Figs. 1, 4, and 6 are endless belts upon which articles A are fed to the machine. The articles A are placed on the conveyor belts 19 and 20 in any convenient manner, such as by being placed thereon by hand. The endless belt of the conveyor 19, Fig. 4, passes over spaced upper pulleys 21 (only one of which is shown) which are identical with upper spaced pulleys 36 for the belt 20, Fig. 6; the conveyor belt 19 also passes over a lower drive pulley 22 which is mounted on a drive shaft 23. The shaft 23 carries a gear 24 which meshes with a gear 25 on a belt tightener pulley 26, over which the belt 19 is trained.

The drive gear 24 fixed to the shaft 23 meshes with a gear 27 which is fixed to a drive shaft 28, Fig. 4. The shaft 28 has a bevel gear 29, fixed thereto, which meshes with a gear 30, on a drive shaft 31, Figs. 4, 5 and 6.

The endless conveyor 20 is driven by the lower drive pulley 32, Figs. 4 and 6, which is mounted on the lower shaft 23. The gear 33 meshes with a gear 34 on a belt tightener pulley 35. The belt 20 trains over the upper spaced pulleys 36.

The feed conveyors 19 and 20 are driven in an identical manner by separate identical means and are operated at the same rate of speed to feed articles A to the article receiving plate 6, Figs. 1, 2, 4 and 6.

The shaft 31, Figs. 4 to 6, carries a bevel gear 37 which meshes with a bevel gear 38. The gear 38 is fixed on a main drive shaft 39 which is operated in any convenient manner, such as by a motor (not shown), or by being connected and driven from another drive shaft. The shaft 39, however, is the main drive shaft for the conveyors 19 and 20, as well as for certain other operating parts of the mechanism of the invention.

Belt supports 40, Fig. 6, are arranged beneath the upper horizontal flat parts of the conveyor belts 19 and 20 to support the belts so as to provide a proper flat surface for the articles which are fed by these conveyors to the top plate or table 6. Guides 41 and 42 respectively, Fig. 1, are arranged on each side of the conveyors 19 and 20 to guide articles being fed by the conveyors and transferred by the transfer wheels 45 and 46. The left hand guides 41 cooperate and are coextensive with curved left hand guides 43 and 44 fixed to the top of the plate or table 6. The guides 43 and 44 each terminate in relative straight parts or pieces which are perpendicular, or substantially perpendicular to the conveyor 15. The conveyors 19 and 20 deliver the articles to the plate 6 where they are picked up by transfer wheels 45 and 46 respectively and delivered to the conveyor 15.

Transfer wheels 45 and 46

The right hand transfer wheel 46 is mounted at the upper end of a vertical shaft 47 which is properly and suitably journalled in bearings carried by the frame, Figs. 2, 5 and 6. A gear 48 is secured to the shaft 47 and meshes with a gear 49 mounted on a stud 50. A plate 51 is fixed to the gear 49 on the stud 50, the plate 51 carrying a stud 52 at or near its periphery and rotatively supports a roller 53, Fig. 5. The roller 53 is adapted to be received in the slot of a guideway 54, which is mounted on, and carried by, a gear 55, the gear 55 being mounted on a stud or shaft 56. The roller 53 in the slot of the guide way 54 gives variable speed to the transfer wheel 46. The gear 55 meshes with a gear 57 rotatively mounted on a shaft 58 which also carries a bevel gear 59. The bevel gear 59 meshes with a bevel gear 60 on the shaft 31. The transfer wheel 46 is given variable speed, being rotated by the shaft 31 through the gearing just described. The operation of the transfer wheel 46 is such that the wheel 46, while rotating continuously, will have variable speeds, slowing down at the time an article from the feed conveyor 20 is first picked up and then increasing in speed until the article is near the conveyor 15, at which time the rotative speed of the wheel 46 will again recede. The alternate slowing down of the wheel 46, during the picking up and discharging points, maintains the article in proper position and prevents it from shifting during the conveying operation, while the speeding up between receiving and discharging positions permits for fast operation in transferring. The slowing down and the accelerating of the speed of the wheel 46 is accomplished by means of the roller guideway connection 53, 54. The wheel 46, being driven from the same driving means which drive the feed conveyors 19 and 20 and in proper synchronization therewith, therefore, operates in proper timed relation. The drive for the feed conveyors 19 and 20 and the wheel 46 is correlated with the drive of the conveyor 15 and operates in proper timed relation therewith.

The transfer wheel 45 is driven from the same drive shaft 58, Fig. 5, which drives the transfer wheel 46 and therefore operates synchronously with the said wheel 46. The wheel 45 is mounted on a vertical shaft 61 which carries a gear 62 meshing with a gear 63, mounted on a stud 64. The gear 63 has a plate 65 fixed thereto, and this plate 65, like the plate 51, carries a stud 66 upon which a roller 67 is mounted. A slotted guideway 68 is mounted on a gear 69 and receives the roller 67 to give variable speed to the wheel 45 in the same manner in which variable speed is transmitted to the transfer wheel 46. The gear 69, which is mounted on a stud 70, meshes with the gear 57 on the drive shaft 58, the shaft 58 being driven from the shaft 31 by the gears 59 and 60, previously described with respect to the wheel 46. The variable speed of the transfer wheel 45 is the same as the variable speed of the transfer wheel 46 and for the same purposes and reasons. The slow speed of the wheel 45, however, occurs during the faster or accelerated speed of the wheel 46 because the transferring operation of the wheel 45 alternates with the transferring operation of wheel 46, so as to permit articles to be delivered properly and alternately from the conveyors 19 and 20. The arrangement and construction is such that an article is first transferred by the wheel 45 from the speed conveyor 19 and then an article from the conveyor 20 is transferred from the conveyor 20 by the wheel 46 to the conveyor 15 alternately, the articles being received successively by the conveyor 15.

The articles from the conveyors 19 and 20 are held in a position and then released at a particular proper time. A holding-releasing means permits the article ready to be transferred from binding with the successive articles on the feed conveyors, particularly should the articles be sticky or tacky, such as pressed mince meat for which the invention is particularly applicable. There is a releasable holder 71 for the conveyor 19, and a second releasable holder 72 for the conveyor 20.

*Releasable holders 71 and 72*

The releasable holder 72 for the feed conveyor 20, Figs. 1, 2, and 6, comprises an elongated horizontal bar 73 which terminates at its outer end into a transverse extending arm or blade 74. The blade or arm 74 extends across the discharge end of the conveyor 20 and holds the successive articles on the conveyor, preventing them from being discharged except at predetermined time intervals. This holder 72 is adapted to be released at periodic time intervals and assists in releasing the articles from the conveyor at the proper time. The arm 74, at the time of its release, causes one article to be broken or released from the next succeeding article, a condition which is desirable, particularly where the articles are of a sticky or tacky nature, such as, pressed mince meat.

The arm 73 passes through the conveyor support 17 and is operatively supported by a collar 75. The inner end of the bar 73 is in the form of a link and is pivotally connected at 76 to the upper arm 77 of a cam lever 78, which is pivoted at 79 to a part of the machine frame. The lower arm 80 of the cam lever 78 carries a roller 81 mounted on a stud 82 on the arm 80 of the cam lever 78. The roller 81 operates in a cam groove 83, formed in a barrel cam 84, which is mounted on the main drive shaft 31. The cam groove 83 of the cam 84 is a continuous one and has two opposed sections, each of which are duplicates, so that during rotation of the cam 84, the cam lever 78 will be oscillated about the pivot 79 and cause horizontal reciprocation of the bar 72. Therefore, during the reciprocatory movement of the bar 73, the holding end or arm 74 will be moved away from the articles on the conveyor 20 at predetermined timed intervals.

The mechanism for operating the holder 71 for the feed conveyor 19 is identical with the mechanism for operating the holder 72. The holder 71 includes an elongated forwardly extending bar 85, which is supported by a collar. This bar 85 terminates at its inner end into a releasable bent end or arm 86. The arm 86 is adapted to be arranged in front of the first article on the feed conveyor 19 and then is released at a predetermined timed interval so as to permit the transfer wheel 45 to transfer the article from the conveyor 19 to the conveyor 15. The bar 85 is pivotally connected at 86 to the upper arm 87 of a second cam lever 88, which, like the cam lever 78, also is pivoted at 79 to the frame. The lower arm 89 of the cam lever 88 carries a stud 90 upon which a roller 91 is revolubly mounted. The roller 91 is adapted to engage the groove 83 in the cam 84 at a point spaced one hundred eighty degrees from the point where the roller 81 is received in the groove 83. The cam groove 83, therefore, causes operation of the rod or arm 85 in identically the same manner in which the cam groove causes operation of the bar 73. The cam groove 83 is so constructed that when the holder 71 is in holding position, the holder 73 will be in released position. The holders 71 and 72, therefore, move to holding and releasing position alternately because the transfer wheels 45 and 46 transfer articles alternately from these transfer wheels to the conveyor 15. The arrangement and construction is such that an article is first transferred from the feed conveyor 19 by the wheel 45 and then an article from the conveyor 20 is transferred by the transfer wheel 46 to be deposited on the conveyor 15. The wheels 45 and 46, while operating continuously, will cause articles to be placed successively in the conveyor 15 from the feed conveyors 19 and 20 alternately.

The transfer wheels 45 and 46 are provided with radially extending arms, the transfer wheel 45 having outwardly extending arms or fingers 92 and 93, which are spaced one hundred eighty degrees apart. The transfer wheel 46 is provided with outwardly extending arms or fingers 94 and 95 which, like the fingers 92 and 93, are spaced one hundred eighty degrees apart. The fingers 92 and 93 of the transfer wheel 45 are positioned at right angles or perpendicular with respect to the fingers 94 and 95 of the transfer wheel 46. An article on a conveyor 19 is adapted to be engaged by finger 92 on the transfer wheel 45, and then positioned properly in a space between lugs 18 on the conveyor chain 15. An article on the conveyor 20 is then adapted to be engaged by the finger 94 on the transfer wheel 46 and positioned properly in a space between the said lugs on the conveyor 15. The continuing rotation of the transfer wheels 45 and 46, therefore, cause articles to be transferred alternately by the fingers 92, 94, 93 and 95 from the conveyors 19 and 20 respectively and placed successively in the spaces between lugs of the conveyor 15 where they are carried to the packaging conveyor chain 7.

The manner in which the articles from the conveyors 19 and 20 are transferred alternately from the conveyors 19 and 20 and placed successively in the conveyor 15 for engagement with the lugs 18 is shown diagrammatically in Figs. 7 to 12 inclusive.

*Operation*

The transfer wheels 45 and 46, Figs. 7 to 12, each revolve simultaneously and continuously and in a clockwise direction. The fingers 92 and 93 on the transfer wheel 45 are spaced one hundred eighty degrees apart and extend radially outward therefrom. The fingers 92 and 93 form a part of this transfer wheel 45 and are preferably formed integrally therewith. The fingers 94 and 95 on the transfer wheel 46 are also spaced one hundred eighty degrees apart, extend radially outward from the transfer wheel 46, and are preferably formed integrally with this transfer wheel. The finger 93 is positioned on the periphery of the transfer wheel 45 and is ninety degrees ahead of the positioning of the finger 95 on the periphery of the transfer wheel 46. The conveyor chain 15 moves to the right in a plane parallel to a line drawn through the centers of shafts 61 and 47. The lugs 18, which are lettered "a" through "g" for the purpose of describing the mode of operation, are fastened transversely to the conveyor chain 15 and extend downwardly from the lower reach of said conveyor chain 15. Between the instants of time represented by each successive view from Fig. 7 through Fig. 12, each lug 18 on the conveyor chain 15 advances a distance equal to one-half the distance between the centers of the shafts 61 and 47.

At the beginning of the operation, the machine being empty and ready for operation and the feed conveyors 19 and 20 being loaded with articles A, the machine transfers articles alternately from the conveyors 19 and 20 to the conveyor 15. For the purpose of describing the operation of the machine, the articles A fed by the conveyor 19 are numbered 1, 3, 5, 7, etc. and articles on the feed conveyor 20 are numbered 2, 4, 6, 8, etc. The transfer wheel 45 picks up successively articles 1, 3, 5, 7, etc. from the feed conveyor 19; similarly, the transfer wheel 46 will pick up successively the articles 2, 4, 6, 8, etc. from the conveyor 20. The operation of the machine will result in article 1 being first placed upon the conveyor chain 15, succeeded by article 2, whereupon article 3 will follow, and so on.

The finger 92 of transfer wheel 45 will first pick up article 1 on the feed conveyor 19, as shown in Fig. 7. The finger 94 on transfer wheel 46 will next pick up article 2 on the feed conveyor 20, as shown in Fig. 8, while article 1 from the feed conveyor 19 is being swung through an arc toward the conveyor chain 15, being guided by guides 41—44 during the transfer movement. The finger 92 on transfer wheel 45 will then place article 1 before lug 18b, said lug 18b now having been moved to a position in a plane radial to transfer wheel 45, as shown in Fig. 9. Simultaneously, article 2 from the feed conveyor 20 will be swung through an arc toward the conveyor chain 15 by the finger 94 of transfer wheel 46, said article 2 being guided by guides 41—44; the finger 93 of transfer wheel 45 will then pick up article 3 from the feed conveyor 19. As a succeeding step, the finger 94 of transfer wheel 46 will place article 2 before lug 18a, said lug 18a having moved to a position in a plane radial to transfer wheel 46; also, the finger 95 of transfer wheel 46 will pick up article 4 from the feed conveyor 20 while finger 93 of transfer wheel 45 swings article 3 through an arc from the feed conveyor 19 toward the conveyor chain 15, as shown in Fig. 10. As a next step, the finger 93 of the transfer wheel 45 will place article 3 before the lug 18d, said lug 18d now having been moved to a position in a plane radial to transfer wheel 45; the finger 92 of transfer wheel 45 will pick up article 5 from the feed conveyor 19; and article 4 from the feed conveyor 20 will be swung through an arc toward the conveyor chain 15, as shown in Fig. 11. The finger 95 of the transfer wheel 46 will then place article 4 from feed conveyor 20 before lug 18c, said lug 18c now having been moved to a position in a plane radial to transfer wheel 46; the finger 94 of transfer wheel 46 will pick up article 6 on feed conveyor 20 and the finger 92 of transfer wheel 45 will swing article 5 from feed conveyor 19 through an arc toward the conveyor chain 15, as shown in Fig. 12.

The previous steps describe the beginning of the article transfer process as relating to an empty machine first being loaded. Articles A will be alternately picked up from the feed conveyors 19 and 20 in the order 1, 2, 3, 4, 5, 6, etc. and will be placed before the lugs 18 on conveyor chain 15 in the same order. The conveyor chain 15 travels to the right and carries articles A in the order 2, 1, 4, 3, 6, 5, etc., reading from right to left, whereby articles from the conveyors 19 and 20 will be positioned alternately in the conveyor 15. Articles are transferred by first transferring the first article from conveyor 19 to conveyor 15, and then transferring the first article on the conveyor 20 to the conveyor 15, the transferring being alternately from one conveyor and then the other alternately and continuously.

*Package conveyor chain 7*

The articles from the conveyors 19 and 20 are transferred by the wheels 45 and 46 and delivered to the conveyor 15 where they are carried to the package conveyor 7 to be packaged by suitable packaging mechanism (not shown). The package conveyor 7 comprises a plurality of buckets 96, Figs. 2 and 3. These buckets 96 are hingedly connected together at their adjacent ends by means of sprocket chain links which are adapted to be engaged by the teeth on the sprocket wheel 8. The conveyor 7 is an endless conveyor and comprises a plurality of hingedly connected buckets 96 which are cut away at their upper ends as indicated at 97, Fig. 3, to permit the lugs 18 of the conveyor 15 to pass therethrough. The buckets 96 are supported by a conveyor support 98 and are prevented from shifting laterally by means of the in-turned flanges 99, which extend inwardly from each side of the support 98, as clearly shown in Fig. 3. The articles, as they are discharged from the conveyor 15, are fed successively into the buckets 96 of the conveyor chain 7 and are then moved to proper position where the articles are packaged in proper cartons. The buckets 96 of the conveyor chain 7 are spaced relatively close together so that the articles to be packaged will be in proper position to be packaged by high speed packaging machinery.

The invention provides new and novel means for picking up articles successively from feed conveyors and depositing them alternately to a single conveyor, the feed conveyors being angularly disposed with regards to the main conveyor 17. The articles A are fed by the feed conveyor to a position where they are in a contact with each other and are then placed on a conveyor which has carrying lugs spaced relatively far apart. The articles from the conveyor 15 are then collected together in relatively close proximity and fed to successive buckets of the conveyor 7, the conveyor buckets carrying the articles A through a series of positions where they are packed in suitable cartons. The invention provides new and novel means of a relatively inexpensive nature for feeding articles to a predetermined position, then transferring the articles to a continuously moving transfer wheel where they are transferred to a continuously operating endless conveyor. The articles are shifted or transferred in the proper sequence and in a proper position to be delivered to a conveyor of a package or cartoning machine. The articles are maintained in a predetermined stationary position until a releasable holder releases them at the proper time intervals. The transfer wheels are constructed, arranged, and driven so that they attain variable speeds to allow for fast operation and at the same time slow down at the picking up and discharging positions. The machine of the invention is relatively simple in construction and may be economically manufactured.

Changes may be made in the form, construction, and arrangement of the parts without departing from the spirit of the invention or sacrificing any of its advantages and the right is hereby reserved to make such changes as fall fairly within the scope of the following claims.

I claim:

1. Conveying and transferring mechanism for rectangular shaped articles comprising a first endless horizontal conveyor for conveying the articles in contacting relationship, means for continuously moving said first conveyor, a second endless horizontal conveyor disposed at an angle to said first conveyor and having spaced partitions thereon and also having the lowermost run thereof located in a plane above said first conveyor, whereby the partitions thereon extend downwardly, a stationary platform located adjacent to and level with the top surface of said first conveyor and extending under said second conveyor, a rotatable wheel having radially extending arms adapted to contact the leading article on the first conveyor and transfer the article onto said platform and under said second conveyor to a position between adjacent partitions of said second conveyor, said arms passing beneath the partition to which the article is conveyed, and means for continuously moving said rotatable wheel and said second conveyor in timed relation.

2. The combination of elements defined in claim 1, and a third conveyor located under and in line with said second conveyor, spaced partitions on said third conveyor adapted to receive the article therebetween from said second conveyor, and means to operate said second and third conveyors in timed relation.

3. The combination of elements defined in claim 1, wherein said last named means rotates said wheel slowly at first to move the article from the first conveyor, then more rapidly while the article is moved over said platform, and then slowly again when the article is moved between the partitions of said second conveyor.

CLARENCE J. MALHIOT.

REFERENCES CITED

The following references are of record in the file of this patent:

UNITED STATES PATENTS

| Number | Name | Date |
|---|---|---|
| 1,246,515 | Young | Nov. 13, 1917 |
| 1,256,070 | Stake | Feb. 12, 1918 |
| 1,281,580 | Johnson | Oct. 15, 1918 |
| 1,457,364 | Hallock et al. | June 5, 1923 |
| 1,872,903 | Cutter | Aug. 23, 1932 |
| 2,026,811 | Bach | Jan. 7, 1936 |
| 2,108,522 | Bergmann | Feb. 15, 1938 |
| 2,362,132 | Haub | Nov. 7, 1944 |
| 2,371,748 | Fedorchak | Mar. 20, 1945 |
| 2,535,859 | McPherson | Dec. 26, 1950 |